Aug. 8, 1950    P. S. ANDERSON    2,517,620
FISH LURE
Filed March 22, 1948

INVENTOR.
PAUL S. ANDERSON.
BY
Robert W. Fulwider
ATTORNEY.

UNITED STATES PATENT OFFICE 2,517,620

FISH LURE

Paul S. Anderson, Long Beach, Calif.

Application March 22, 1948, Serial No. 16,340

4 Claims. (Cl. 43—42.06)

My invention relates to the field of fishing equipment, and more particularly to a fish lure.

Although a number of fish lures have been devised and marketed in the past, the majority of these devices have depended on attracting fish thereto by the lure being painted a vivid color or one that is similar in appearance to the small fish on which the larger game fish feed. It will be apparent that such lures have the disadvantage that a number of these devices must be carried by the sportsman in order that a particular lure can be used which when being moved through the water will correspond favorably in appearance to the smaller animals or fish on which the game fish sought happen to be feeding. Thus, even the most skilled fisherman is subjected to a trial and error period in determining the particular lure that game fish will take on a certain day, which is of course time consuming, and may result in the proper lure not being found until after the feeding time for the game fish has expired.

It is the purpose of my invention to eliminate the previously mentioned disadvantages by providing a lure which when moved through the water will resemble a silvery minnow, which as is well known to fishermen is attractive to practically all game fish.

A major object of my invention is to provide a fish lure formed from an elongated translucent cylindrical body having a polished longitudinally twisted metallic strip rigidly mounted within the confines thereof, with the strip being adapted to reflect sunlight passing beneath the surface of the water in a number of directions, and by such reflection attracting fish to the lure; that will be extremely simple to operate in that it works equally effectively at any time of the day in which light passes beneath the surface of the water; and by such operation the normal trial and error period which the average fisherman experiences prior to finding the correct lure is eliminated.

Another object of my invention is to supply a fish lure having an extremely simple mechanical structure, that can easily be manufactured from inexpensive materials, and hence sold in the low priced merchandising field.

These and other objects and advantages of my invention will become apparent from the following description of a preferred form thereof and from the drawing illustrating that form in which.

Figure 1:
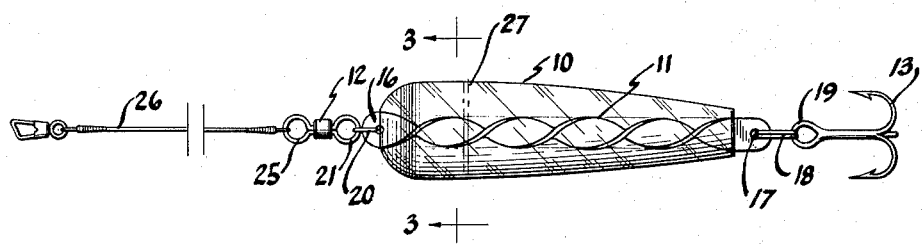
Fig. 1 is a side elevational view of my fishing lure showing the elongated translucent cylindrical body portion thereof with a highly polished longitudinally twisted strip extending therethrough.
Figure 2:
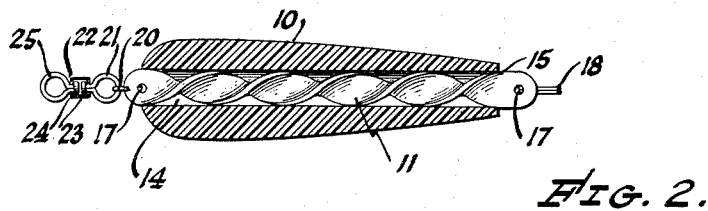
Fig. 2 is a vertical cross-sectional view of the device.

Referring to Figs. 1 and 2 for the general arrangement of my invention, it will be seen that a translucent body 10 has a twisted highly polished strip 11 extending longitudinally therethrough, with the strip being provided on one end with a swivel 12 and on the opposite end with a three-pronged fish hook 13.

Figure 3:
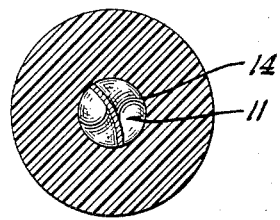
Fig. 3 is a vertical cross-sectional view of the device taken on the line 3—3 of Fig. 1.

The body 10 has an annular cross-section as can best be seen in Fig. 3, with the body being so formed that its largest cross-sectional diameter is near the forward end thereof, and the portion of the body situated in front of the largest cross-sectional diameter curving downwardly sharply to terminate at the entrance to a bore 14. The balance of the body 10 slopes slightly downwardly in a rearwardly extending direction.

In Fig. 2 it will be seen that the bore 14 extends longitudinally through the body 10 to terminate at an exit 15. As the successful operation of my lure is dependent on light being reflected in a number of directions from the highly polished surface of the twisted strip 11 whereby it will be visible to fish that may be situated at various elevations, it is essential that the body 10 be formed from a transparent or translucent material such as one of the numerous plastics that are commercially available for such purposes. In forming the body 10, I have found that it can either be molded from a suitable plastic material or turned from heavy walled tube stock formed from the same material.

Figure 4:
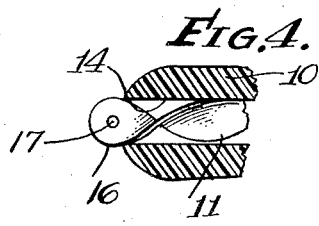
Fig. 4 is a fragmentary vertical cross-sectional view of the forward portion of the device showing the flared end for holding the twisted strip in position.

The strip 11 is formed from metal which is plated with a non corroding metallic material such as nickel or chromium that is capable of taking a high polish to reflect light falling thereon. In Fig. 4 it will be noted that the forward end of the strip 11 is flared slightly whereby upon the strip being twisted into shape shown in this figure the flared portion 16 will prevent it from being pulled through the bore 14. An opening 17 is formed near the outer extremity of each end of the strip 11, with the forwardly positioned opening being used to affix the swivel 12 thereto, and the rearwardly positioned opening serving to movably affix the hook 13 to the rearward portion of the strip.

Due to the width of the strip 11 being but slightly smaller than the interior diameter of the bore 14 it will be apparent that with the strip positioned in the body 10 as shown in Figs. 1 and 2 that the twisted portion of the strip forms a longitudinal rearwardly extending spiral channel with the interior surface of the bore 14 through which water is forced as the body 10 is moved forwardly. It will of course be apparent that as the water remains stationary as the body 10 is drawn therethrough that the spiral channel formed in the strip 11 will impart a rotary movement to the body 10 about its longitudinal axis and light falling on the twisted strip 11 when it is being so rotated will be reflected in a number of different directions to give the impression of a silvery object moving through the water. Such reflections, coupled with the somewhat hazy outline of the translucent plastic body 10 in the water attracts the larger game fish that are caught on the hook 13 when they attack my lure.

Although any one of the conventional fish hooks can be used with my lure I prefer to use a three-pronged hook 13 having an eye formed on the upper portion of the shank, which eye serves to support the hook from the rearward portion of the strip 11 by engaging a ring 18 that is mounted in the rearwardly positioned opening 17.

To both draw my lure through the water, and to permit it to rotate when being so drawn, a ring 20 engages the forwardly positioned opening 17 and the ring 21 formed on the rearward portion of the swivel 12. While a number of commercially available swivels may be used as the swivel 12, I prefer to use one which is formed from a cylindrical housing 22 having forwardly and rearwardly positioned discs 23 and 24 respectively, rotatably mounted therein. The disc 23 is rigidly connected to the ring 21 by a pin that extends through the rearward portion of the housing 22, while the disc 24 is connected to a forwardly positioned ring 25 in a similar manner. Extending forwardly from the ring 25 is a leader 26 that is affixed in a conventional manner to the lower portion of the fisherman's line.

The operation of my invention is extremely simple. Upon the device being desired to be used it is affixed by the leader 26 to the fisherman's line in a conventional manner, and the lure then cast into the water from which game fish are to be taken. By the use of such well known fishing methods as trolling or casting the lure is drawn slowly through the water with the result that as such movement takes place water is forced through the bore 11 and the continuous spiral passage formed by the twisting of the strip 11 imparts rotation to the body 10. As such rotation of the body 10 takes place, the disc 23 in the swivel 12 rotates freely to prevent twisting of the supporting leader 26.

I have found from experience that my lure operates to best advantage when it is being drawn through water which is sufficiently clear for light to penetrate underneath the surface thereof, with the result that such light falling on the brightly polished surface of the strip 11 is reflected by the twisted portion thereof in a number of directions. Thus, whether a game fish is situated near the surface of the water or at some depth thereunder, such reflected light rays will attract its attention to my lure which is moving through the water, and due to the translucency of the body 10 its resemblance to a silvery minnow is sufficiently close to normally cause game fish to attack the lure. To increase further the attractiveness of my lure to game fish, I have found it desirable under some conditions to have a thin annular red band 27 formed on the exterior surface thereof slightly behind the portion of the largest diameter as indicated by phantom lines in Fig. 1. However, such a band is ordinarily not necessary in attracting fish to my lure, and I prefer normally to furnish the lure without it being so marked.

Another modification in my lure which I have found particularly advantageous in attracting certain game fish is to have one side of the strip 11 finished in a bright color, with the opposite side having a light reflecting surface as previously described. Thus, as the lure is rotated in passing through the water an impression of color in motion is obtained together with flashes of light which are reflected from the rotating reflecting surface.

Should it be desired my lure can be constructed as previously described with the body 10 omitted therefrom. Likewise the lure can be constructed by eliminating the strip 11 and using a body 10 having a fluted longitudinal bore extending therethrough to impart rotation to the body as it is moved through the water. Of course, in the last mentioned form of my device the swivel 12 and hook 13 would be affixed by conventional means to the body 10, and portions of the flutes would be provided with a light reflecting material or color.

While the particular device herein shown and described is fully capable of attaining the objects and providing the advantages hereinbefore stated, it is to be understood that it is merely illustrative of the presently preferred form of my invention, and that I do not mean to limit myself to the details of construction or design herein shown other than as defined in the appended claims.

I claim:

1. A fish lure which includes: a body, with said body having a bore formed therein: a twisted strip rigidly positioned within the confines of said bore, with said strip forming a spiral passage with the surface of said bore whereby said body is rotated as said body is drawn through water; and hook means supported from said strip whereby a fish is engaged by said hook means upon said fish attacking said lure due to the forward movement and rotation thereof.

2. A fish lure which includes: a translucent body, with said body having a bore formed therein; a twisted strip positioned within the confines of said bore, with said strip having a brilliant surface adapted to reflect light, and said strip forming a spiral passage with the surface of said bore adapted to cause the rotation of said body as said body is drawn through water; and hook means supported from said strip, with said hook means being adapted to engage a fish attacking said lure which is attracted thereto by the forward movement of said lure and the light reflected from said strip.

3. A fish lure which includes: an elongated translucent body, with said body having a longitudinal extending bore formed therein: a longitudinally twisted strip having a light reflecting surface, with said strip being positioned in said bore to cause the longitudinal rotation of said body as it is moved through the water whereby light falling on said surface is reflected in constantly changing directions and said strip having an enlarged forward end to prevent said strip being pulled rearwardly through said bore; means for affixing a swivel to said enlarged portion whereby said body can rotate on its longitudinal axis as water moves through said bore; and a fish hook movably affixed to the opposite end of said strip whereby a fish will be engaged that is attracted to attack said lure.

4. A fish lure which includes: an elongated transparent body, with said body having a longitudinally extending bore formed therein; a longitudinally twisted strip positioned within the confines of said bore, with said strip having a brilliant surface adapted to reflect light, and said strip forming a spiral passage with the surface of said bore adapted to cause the rotation of said body on its longitudinal axis as said body is drawn through water; and hook means supported from said strip, with said hook means being adapted to engage a fish attacking said lure which is attracted thereto by the forward movement of said lure and the light reflected from said strip.

PAUL S. ANDERSON.

REFERENCES CITED

The following references are of record in the file of this patent:

UNITED STATES PATENTS

| Number | Name | Date |
|---|---|---|
| Re. 13,499 | Breder et al. | Dec. 24, 1912 |
| 810,822 | Tinkess | Jan. 23, 1906 |
| 1,848,704 | Farley | Mar. 8, 1932 |
| 2,001,055 | DeWitt | May 14, 1935 |
| 2,078,816 | Schenitz | Apr. 27, 1937 |
| 2,127,761 | Beck | Aug. 23, 1938 |
| 2,163,666 | Carter et al. | June 27, 1939 |
| 2,191,672 | Malicki | Feb. 27, 1940 |
| 2,387,255 | Godlewski | Oct. 23, 1945 |